(12) United States Patent
Uto et al.

(10) Patent No.: US 9,261,915 B2
(45) Date of Patent: Feb. 16, 2016

(54) ELECTRONIC APPARATUS, LIGHT-TRANSMISSIVE COVER PLATE, AND PORTABLE DEVICE

(71) Applicant: Kyocera Corporation, Kyoto-shi, Kyoto (JP)

(72) Inventors: Takashi Uto, Higashiomi (JP); Kuniaki Mitsuda, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/455,174

(22) Filed: Aug. 8, 2014

(65) Prior Publication Data

US 2015/0177790 A1 Jun. 25, 2015

(30) Foreign Application Priority Data

Dec. 21, 2013 (JP) .................................. 2013-264698

(51) Int. Cl.
| | |
|---|---|
| *H04M 1/00* | (2006.01) |
| *H04M 9/00* | (2006.01) |
| *H04R 25/00* | (2006.01) |
| *G06F 1/16* | (2006.01) |

(Continued)

(52) U.S. Cl.
CPC ............ *G06F 1/1656* (2013.01); *G06F 1/1605* (2013.01); *H04M 1/03* (2013.01); *H04R 17/00* (2013.01); *H04R 2400/03* (2013.01); *H04R 2499/11* (2013.01)

(58) Field of Classification Search
CPC ...... G06F 1/1656; G06F 1/1605; H04R 17/00
USPC .................. 379/419, 428.01, 428.03, 428.04; 455/575.1, 90.3; 428/212, 213, 700; 359/443; 361/679.21, 679.3
See application file for complete search history.

(56) References Cited

U.S. PATENT DOCUMENTS

| | | | |
|---|---|---|---|
| 2009/0049773 A1* | 2/2009 | Zadesky et al. ............ | 52/204.62 |
| 2012/0249281 A1 | 10/2012 | Campbell et al. | |

(Continued)

FOREIGN PATENT DOCUMENTS

| | | |
|---|---|---|
| JP | 2002-201096 | 7/2002 |
| JP | 2008-111984 A | 5/2008 |

(Continued)

OTHER PUBLICATIONS

International Search Report Dated Mar. 3, 2015, issued for International Application No. PCT/JP2014/081733.

*Primary Examiner* — Tuan D Nguyen

(74) *Attorney, Agent, or Firm* — Procopio, Cory, Hargreaves & Savitch LLP

(57) ABSTRACT

An electronic apparatus and a light-transmissive cover plate are disclosed. The electronic apparatus includes an image display device that includes an image display surface; a casing that houses at least a portion of periphery of the image display device; a light-transmissive cover plate that includes a first surface facing the image display surface, at least a peripheral edge region of the first surface is bonded to the casing; and a joining member that bonds the peripheral edge region of the first surface to the casing. The joining member has a Young's modulus smaller than that of the light-transmissive cover plate. The light-transmissive cover plate includes a gradual reduction area, and in this gradual reduction area, thickness is gradually reduced towards an outermost edge. At least a portion of the peripheral edge region of the first surface of the light-transmissive cover plate is included in the gradual reduction area.

11 Claims, 15 Drawing Sheets

(51) Int. Cl.
*H04R 17/00* (2006.01)
*H04M 1/03* (2006.01)

(56) References Cited

U.S. PATENT DOCUMENTS

| | | |
|---|---|---|
| 2013/0236699 A1 | 9/2013 | Prest et al. |
| 2013/0328792 A1 | 12/2013 | Myers et al. |
| 2014/0023430 A1 | 1/2014 | Prest et al. |
| 2014/0030443 A1 | 1/2014 | Prest et al. |

FOREIGN PATENT DOCUMENTS

| | | |
|---|---|---|
| JP | 2009-216763 A | 9/2009 |
| JP | 2011-021929 A | 2/2011 |
| JP | 2011-061316 | 3/2011 |
| JP | 2013-218245 A | 10/2013 |
| JP | 2013-247661 A | 12/2013 |
| WO | 2008-018551 A1 | 2/2008 |
| WO | 2012-029347 A1 | 3/2012 |
| WO | 2013-146225 A1 | 10/2013 |

* cited by examiner

ELECTRONIC APPARATUS, LIGHT-TRANSMISSIVE COVER PLATE, AND PORTABLE DEVICE

CROSS-REFERENCE TO RELATED APPLICATION

The present application claims priority under 35 USC §119 to Japanese Patent Application No. 2013-264698 filed on Dec. 21, 2013, entitled "Electronic Apparatus and Light-Transmissive Cover Plate", the entirety of which is incorporated herein by reference.

BACKGROUND OF THE INVENTION

1. Field

The present invention relates to an electronic apparatus and a light-transmissive cover plate.

2. Background

In the related art, an electronic apparatus such as a digital camera or a mobile phone with an image display device such as a liquid crystal panel or an organic electroluminescent (EL) panel is used. Recently, portable electronic apparatuses (alternatively known as portable electronic devices) such as smartphones, tablets, and smartwatches, which display a relatively large image on an image display device and include an input device such as a touch panel, have become widespread. A light-transmissive cover plate for protecting the image display is arranged in the portable electronic apparatus. If the electronic apparatus is dropped, then the light-transmissive cover plate may be subjected to a strong impact.

SUMMARY

Accordingly, one embodiment of the present invention is an electronic apparatus comprising an image display device that includes an image display surface; a casing that houses at least a portion of periphery of the image display device; a light-transmissive cover plate that includes a first surface facing the image display surface, at least a peripheral edge region of the first surface is bonded to the casing; and a joining member that bonds the peripheral edge region of the first surface to the casing. The joining member has a Young's modulus smaller than that of the light-transmissive cover plate. The light-transmissive cover plate includes a gradual reduction area, and in this gradual reduction area, thickness is gradually reduced towards an outermost edge. At least a portion of the peripheral edge region of the first surface of the light-transmissive cover plate is included in the gradual reduction area.

Another embodiment of the present invention is a light-transmissive cover plate for an electronic apparatus that has an image display device which includes an image display surface and a casing which houses at least a portion of periphery of the image display device. The transmissive cover plate includes a first surface at least a part of which faces the image display surface and at least a peripheral edge region of which is bonded to the casing. The light-transmissive cover plate includes a gradual reduction area, and in this gradual reduction area, thickness is gradually reduced towards an outermost edge. At least a portion of the peripheral edge region of the first surface of the light-transmissive cover plate is included in the gradual reduction area.

A potential benefit is that when the electronic apparatus is subjected to a strong impact, the light-transmissive cover plate is less likely to crack or break.

BRIEF DESCRIPTION OF THE DRAWINGS

FIG. 4A is a schematic perspective view and FIG. 4B is an enlarged cross-sectional view.

DETAILED DESCRIPTION

Hereinafter, an embodiment of the present invention will be described with reference to the accompanying drawings.

<External Appearance of Electronic Apparatus>

Figure 1:
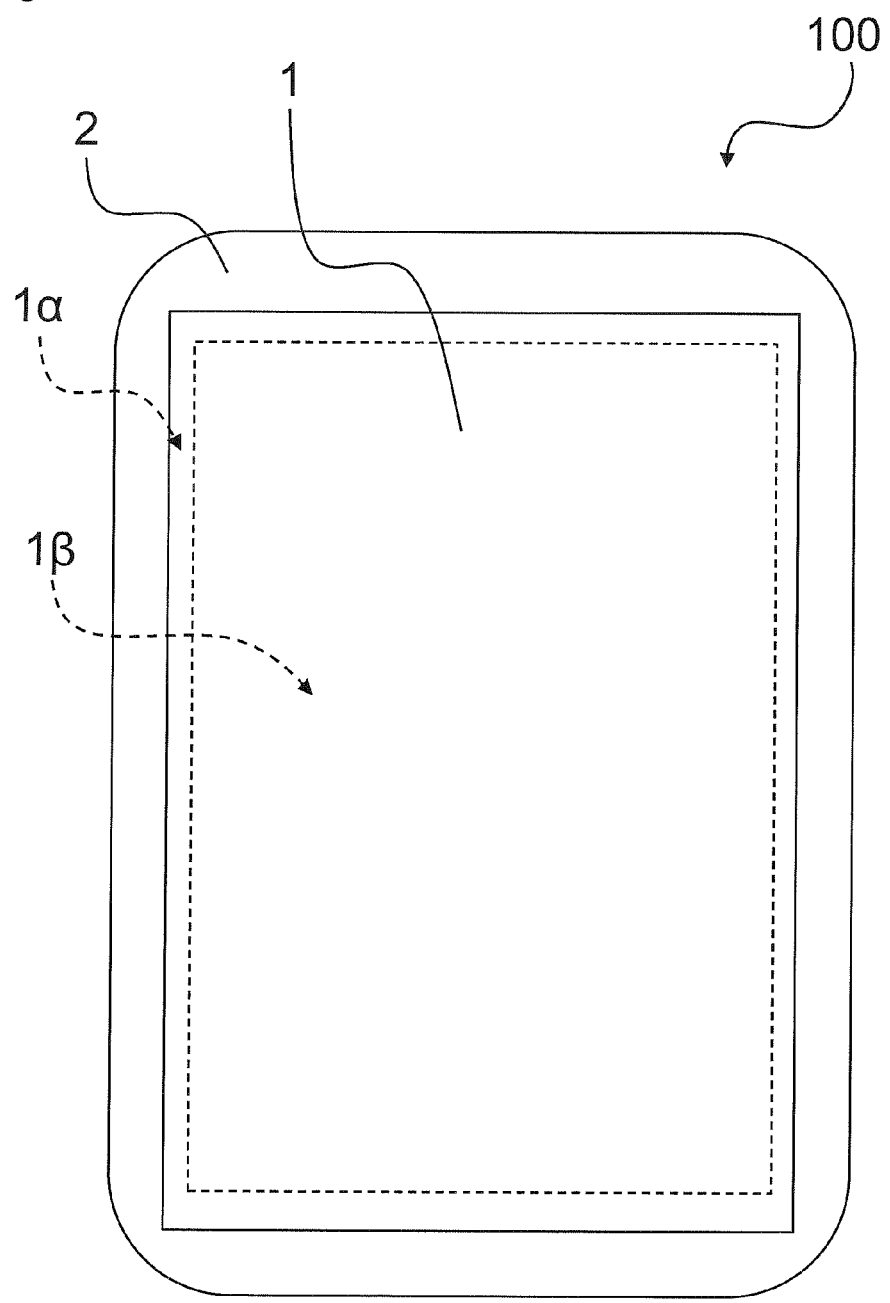
FIG. 1 is a front view schematically describing an embodiment of an electronic apparatus.

FIG. 1 is a front view schematically describing an electronic apparatus 100 which is an embodiment of the electronic apparatus of the present invention. The electronic apparatus 100 includes a light-transmissive cover plate 1 and a casing 2. The light-transmissive cover plate 1 is split into a central area 1β and a gradual reduction area 1α. As depicted in FIG. 1, the central area 1β is surrounded by the gradual reduction area 1α.

Figure 2:
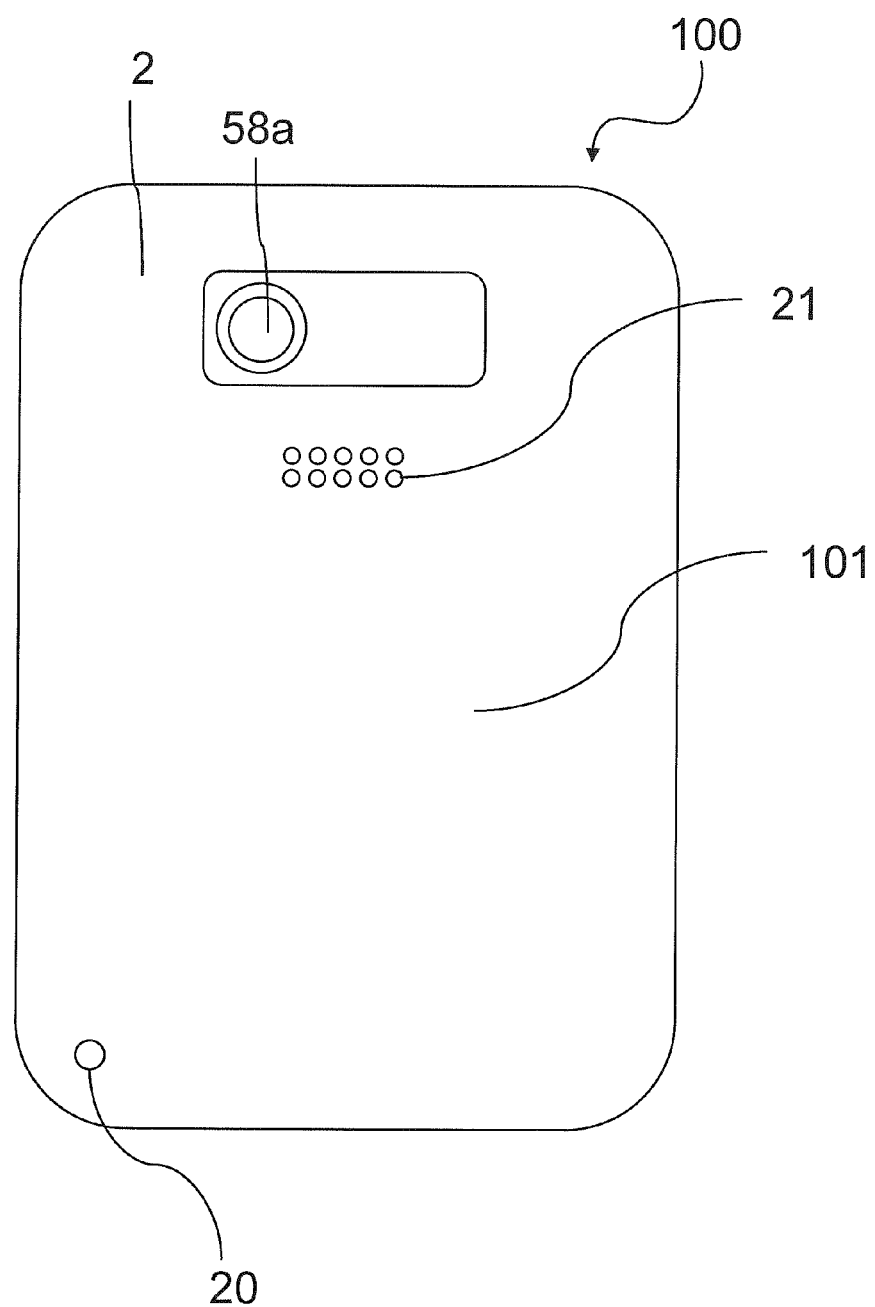
FIG. 2 is a rear view illustrating the external appearance of the electronic apparatus.

FIG. 2 is a rear view illustrating the electronic apparatus 100. A speaker hole 20 and a microphone hole 21 are formed on a back surface 101 of the electronic apparatus 100, that is, the back surface 101 of the casing 2. Further, an imaging lens 58a of an imaging unit 58 described below is exposed from the back surface 101 of the electronic apparatus 100.

Figure 3:
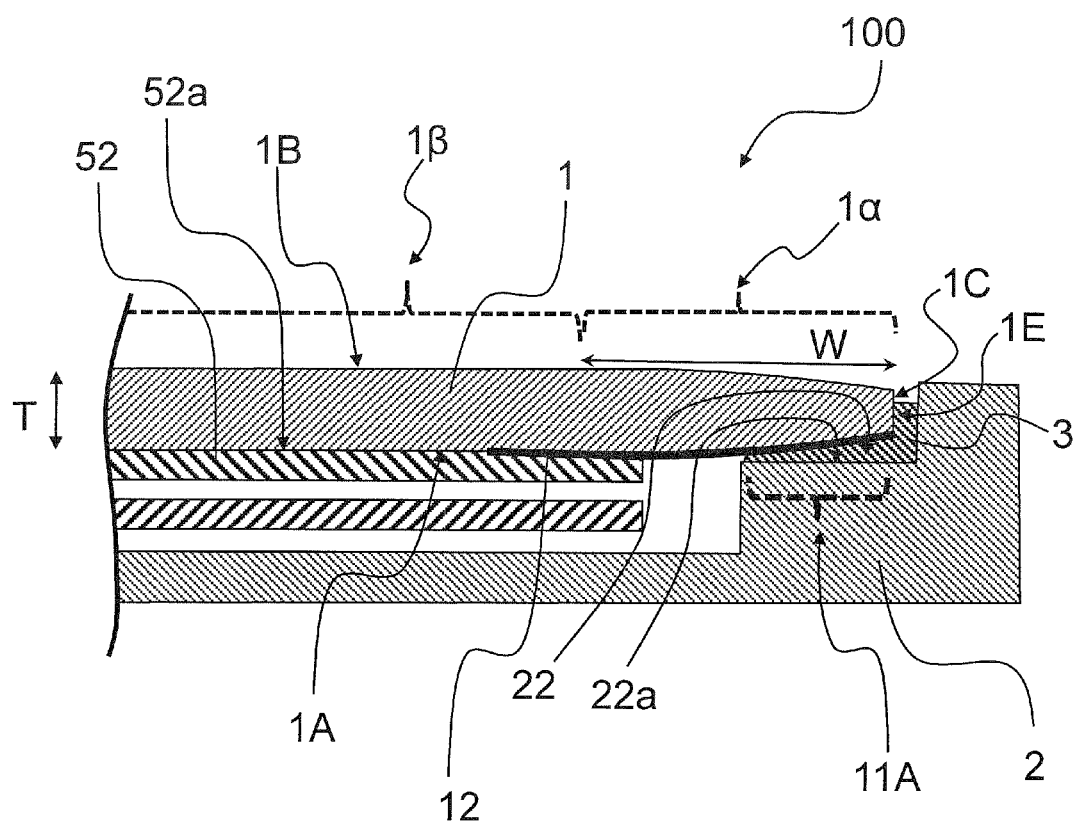
FIG. 3 is an enlarged cross-sectional view of the electronic apparatus.

FIG. 3 is an enlarged cross-sectional view of a portion of the electronic apparatus 100.

Figure 4A:
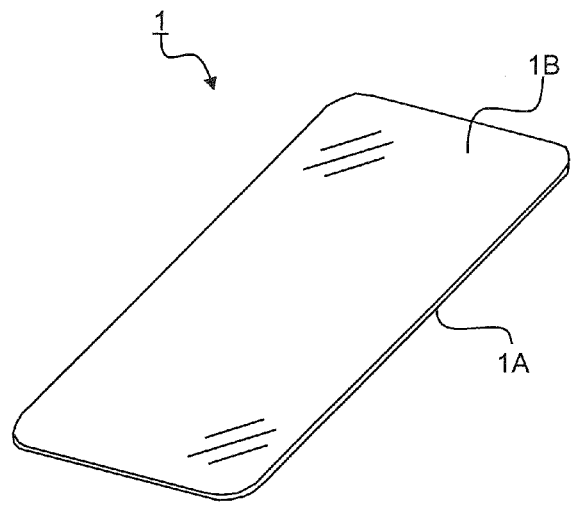
FIGS. 4A and 4B are views illustrating a light-transmissive cover plate, which is included in the electronic apparatus.
Figure 4B:
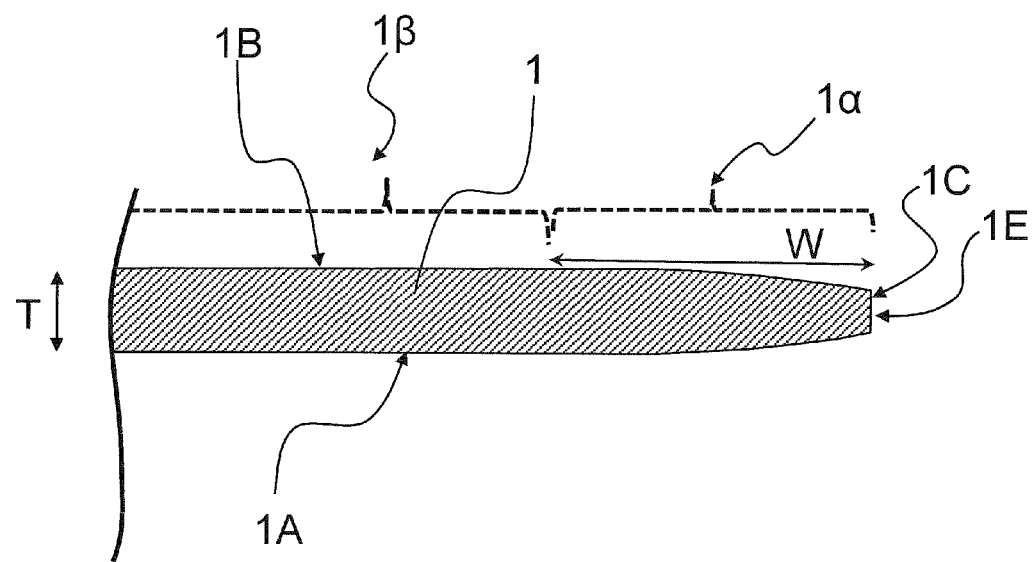

FIGS. 4A and 4B are views illustrating a light-transmissive cover plate 1 which is an embodiment of the light-transmissive cover plate of the electronic apparatus 100. FIG. 4A is a schematic perspective view, and FIG. 4B is an enlarged cross-sectional view of a portion of the light-transmissive cover plate 1.

The particular embodiment of the electronic apparatus 100 illustrated in FIGS. 1 to 4 is a portable device known as a smartphone, which has a communication function.

As illustrated in FIG. 3, the electronic apparatus 100 includes a casing 2, an image display device 52 with an image display surface 52a in the casing 2, a light-transmissive cover plate 1 which includes a first surface 1A facing the image display surface 52a and a second surface 1B which is positioned on the opposite surface of the first surface 1A. The peripheral edge region 11A of the first surface 1A is bonded to the casing 2 by a joining member 3, which has a Young's modulus smaller than that of the light-transmissive cover plate 1. The light-transmissive cover plate 1 includes a gradual reduction area 1α. The thickness of the gradual reduction area 1α is gradually reduced towards an outermost edge 1E of the peripheral edge region 11A. At least a portion of the peripheral edge region 11A of the first surface 1A is included in the gradual reduction area 1α. For example, a width W of the gradual reduction area is preferably 0.1 mm to 5 mm and a thickness T thereof is preferably less than the thickness of the central area 1β by the range of 0.01 mm to 1 mm.

As shown in FIG. 3, the outermost edge 1E corresponds to the outermost line of the light-transmissive cover plate 1, when seen in a direction perpendicular to the first surface 1A. The light-transmissive cover plate 1 has a side surface 1C. The outermost edge 1E is positioned on the side surface 1C. Because the light-transmissive cover plate 1 includes a gradual reduction area 1α whose thickness is gradually reduced towards the outermost edge 1E of the peripheral edge region 11A, when an external force in a direction toward the light-transmissive cover plate 1 through the casing 2 is applied, the external force applied to the light-transmissive cover plate 1 is weakened because the external force is absorbed by the space between the casing 2 and the light-transmissive cover plate 1, which is provided by the gradual reduction area 1α. For example when the electronic apparatus 100 is dropped, the external force applied to the light-transmissive cover plate 1 may be weakened as described above.

In addition, the joining member 3 is arranged such that the joining member continuously surrounds the peripheral edge region 11A of the first surface 1A to the side surface 1C including the outermost edge 1E. The side surface 1C is bonded to the casing 2 through the joining member 3 as well as peripheral edge 11A.

The light-transmissive cover plate 1 has transparency and mainly includes a single crystal having alumina ($Al_2O_3$) as a main component. In the present embodiment, the meaning of "main component" is that the component is contained by the amount of at least 50% by mass and preferably 70% by mass. A transparent single crystal with alumina ($Al_2O_3$) as a main component is generally referred to as sapphire, which resists being damaged and broken. The transparent single crystal has high thermal conductivity and high heat dissipation. Further, since the Young's modulus is in the range of 380 GPa to 240 GPa, the transparent single crystal resists deformation, meaning that it is hardly deformed.

The transparent light-transmissive cover plate 1 may also be made of glass, an acrylic resin, or the like. However it is preferable that the light-transmissive cover plate 1 be made of a single crystal containing alumina ($Al_2O_3$), also known as sapphire, as the main component from a view point that sapphire resists being damaged or broken. When the light-transmissive cover plate is made of a single crystal containing alumina ($Al_2O_3$), it may also be referred to as a sapphire plate. In the present embodiment, the term "transparency" is a property in which a transmittance with respect to visible light is 50% or more. The thickness of the light-transmissive cover plate 1 of this embodiment is, for example, approximately 4 mm.

Moreover, the gradual reduction area 1α of the first surface 1A of the light-transmissive cover plate 1 has an arithmetic average roughness (Ra) greater than an arithmetic average roughness (Ra) of a central area 1β. The central area 1β is positioned closer to the central side of the first surface 1A than the gradual reduction area 1α. For example, while the arithmetic average roughness (Ra) in the central area 1β on the first surface 1A is approximately 0.05 nm to 0.08 nm, the arithmetic average roughness (Ra) in the gradual reduction area 1α on the first surface 1A is approximately 0.1 nm to 0.2 nm, which is greater than that of the central area 1β. In the present embodiment, the arithmetic average roughness (Ra) may be measured using, for example, an atomic force microscope described below.

In the present embodiment, the casing 2 includes a polycarbonate resin as a main component. Other examples of the main component of the casing 2 include resin materials such as an ABS (acrylonitrile butadiene styrene) resin or a nylon-based resin, or a material which is the same as that of the light-transmissive cover plate. The components of casing 2 are not limited to the examples given above but rather include all materials that are normally used by a person skilled in the art. Furthermore, the casing 2 may be comprised of one single member, or it may be comprised of a combination of a plurality of members.

The image display device 52 is a liquid crystal display panel, which has a backlight unit and a liquid crystal layer. Image information displayed on the image display device 52 is formed by white light which is emitted from an LED lamp of the backlight unit being colored by passing through the liquid crystal layer included in the image display device 52. That is, while the white light emitted from the LED lamp passes through the liquid crystal layer, a wavelength band of the white light is limited, then the image information indicating characters having various colors and shapes, symbols, and drawings is formed. The light indicating the image information formed in this manner is transmitted from the first surface 1A of the light-transmissive cover plate 1 to a second surface 1B, and enters eyes of an operator or user of the electronic apparatus 100. The operator recognizes the characters, the symbols, and the drawings indicated by the image information.

A light shielding black film layer 12 may be provided in a partial area including the peripheral edge region 11A of the first surface 1A of the light-transmissive cover plate 1. The portion corresponding to the light shielding film layer 12 is a non-display portion in which the information is not displayed. A touch panel 53 is attached to the first surface 1A of the light-transmissive cover plate 1. The operator or user can give various instructions with respect to the electronic apparatus 100 through the touch panel 53 by touching an area corresponding to a display portion of the second surface 1B of the light-transmissive cover plate 1 with a finger or the like.

As illustrated in FIG. 3, the casing 2 of the electronic apparatus 100 includes a step portion 22. The light-transmissive cover plate 1 is bonded to the step portion 22. Specifically, the first surface 1A of the light-transmissive cover plate 1 is bonded to a step surface 22a of the step portion 22 through the joining member 3. The peripheral edge region 11A of the first surface 1A is an area in contact with the joining member 3 as described above, and the peripheral edge region 11A of the first surface 1A in the present embodiment corresponds to a portion facing the step surface 22a.

The joining member 3 may be formed by a cured adhesive. A liquid resin having high viscosity including, for example, an epoxy resin and an acrylic resin as main components, is cured by heat or ultraviolet rays to form the joining member 3. The Young's modulus of the joining member 3 is less than 0.1 GPa, and is smaller than that of the single crystal containing alumina ($Al_2O_3$) as a main component (hereinafter, simply referred to as sapphire).

Since the joining member 3 has a Young's modulus smaller than that of the light-transmissive cover plate 1, a potential benefit is that when an external force in a direction toward the central side in the light-transmissive cover plate 1 through the casing 2 and the joining member 3 is applied from the outer surface of the casing 2 to the light-transmissive cover plate 1, the joining member 3 may absorb the external force by being deformed. That is, the energy of the external force is absorbed by the deformation of the joining member 3. Thus the amount of external force applied to the light-transmissive cover plate 1 is lessened. For example, in cases where the electronic apparatus 100 is dropped and the side surface or corner of the casing 2 collides with the ground, an impact or external force in a direction toward the central side in the light-transmissive cover plate 1 through the casing 2 and the joining member 3 is applied to the light-transmissive cover plate 1. In such cases, the external force due to such impact is reduced because of the deformation of the joining member 3.

Figure 5:
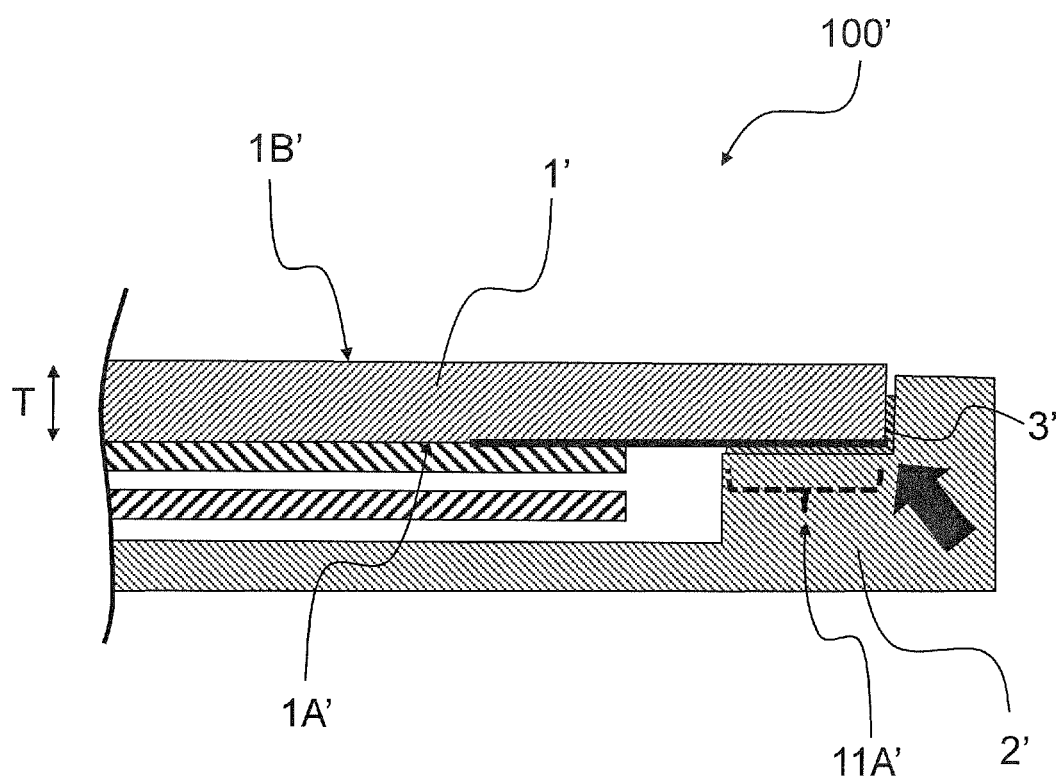
FIG. 5 is an enlarged cross-sectional view illustrating an example of the electronic apparatus in the related art.

FIG. 5 is an enlarged cross-sectional view of an electronic apparatus 100' as an example of the electronic apparatus in the related art for comparison with the present embodiment. In the electronic apparatus 100' in the related art, the width between a first surface 1A' and a second surface 1B' of the light-transmissive cover plate 1' is constant throughout the entire area including a peripheral edge region 11A' of the first surface 1A'. The thickness of an area corresponding to the peripheral edge region 11A' in a joining member 3' is relatively still small. Consequently, in a case where an impact or other external force, as indicated by an arrow in FIG. 5, is applied to the outside the casing 2', the force is not sufficiently absorbed by deformation of the joining member 3'. Thus, a relatively large force is applied to the light-transmissive cover plate 1, which in turn leads to the light-transmissive cover plate 1' being relatively easily cracked or broken.

In the present embodiment, the light-transmissive cover plate 1 includes the gradual reduction area 1α whose thickness is gradually reduced toward the outermost edge 1E. The peripheral edge region 11A of the first surface 1A is included in the gradual reduction area 1α. Therefore, in the electronic apparatus 100, the thickness of the joining member 3 in a portion corresponding to the peripheral edge region 11A of the first surface 1A is gradually increased. In this manner, even when the electronic apparatus 100 is dropped as described above, the joining member 3 has increased capacity to absorb the external force in the portion corresponding to the peripheral edge region 11A. Therefore, the external force applied to the light-transmissive cover plate 1 can be reduced. Accordingly, in the electronic apparatus 100, the light-transmissive cover plate 1 may have increased resistance to being cracked or broken. In the present embodiment, the width W of the gradual reduction area 1α may vary but is preferably approximately 0.1 mm to 1 mm. The thickness of the outermost edge 1E of the gradual reduction area 1α is approximately 0.1 mm, which is less than that of the central portion.

In the first surface 1A of the light-transmissive cover plate 1, the arithmetic average roughness (Ra) of the gradual reduction area 1α is greater than the arithmetic average roughness (Ra) of the central area 1β. Accordingly, the surface area of the gradual reduction area 1α is larger than the surface area of the central area 1β because the surface area of the gradual reduction area 1α includes the larger unevenness than the surface area of the central area 1β. The joining member 3 erodes the unevenness of the surface so that a so-called anchor effect is generated. Therefore, the bonding strength between the first surface 1A of the light-transmissive cover plate 1 and the joining member 3 is increased.

In the present embodiment, the arithmetic average roughness (Ra) of the gradual reduction area 1α is approximately 0.1 nm to 0.2 nm. On the other hand, the arithmetic average roughness (Ra) of the central area 1β is approximately 0.05 nm to 0.08 nm. A large part of the central area 1β corresponds to a display unit through which the light indicating the image information such as characters, symbols, drawings, and the like passes. Therefore, the smaller arithmetic average roughness (Ra) of the central area 1β than the gradual reduction area 1α allows the reduction of scattering of the light indicating the image information.

The gradual reduction area 1α of the light-transmissive cover plate 1 may be produced by sharpening a part of the surface by processing using a machine. Also, a gradual reduction area 1α of the light-transmissive cover plate 1 can be formed by polishing using a polishing pad or the like. In the process of polishing the surface by pressing the polishing pad to the surface of a light-transmissive cover plate 1, particularly in a case where the polishing pressure is set to be high, there is a tendency that the polishing pressure applied to the peripheral edge region of the a light-transmissive cover plate 1 becomes greater than the polishing pressure applied to the central portion. Therefore, a gradual reduction area 1α whose thickness is reduced toward the most peripheral edge 1α can be formed in the peripheral edge of the light-transmissive cover plate 1 using this tendency.

Hereinafter, an example of a production process of the light-transmissive cover plate 1 using sapphire as a main component will be described. For example, in a case where the light-transmissive cover plate 1 is configured by sapphire as a main component, polishing is first performed on the first surface 1A. The polishing uses a copper plate as the polishing pad. In a first polishing, mechanical polishing using diamond abrasive grains having a grain diameter of approximately 1 μm to 3 μm as abrasive grains for polishing is performed. The pressing pressure of the polishing pad is set to be 100 g/cm² to 500 g/cm². The polishing pad is rotated at a rotation speed of 30 rpm to 100 rpm. After the first polishing, chemical mechanical polishing (CMP) as a second polishing using colloidal silica abrasive grains having a grain diameter of approximately 20 μm to 80 μm as abrasive grains for polishing is performed to the first surface 1A. In this chemical mechanical polishing, the pressing pressure of the polishing pad is set to be 100 g/cm² to 500 g/cm². The polishing pad is rotated at a rotation speed of 30 rpm to 100 rpm. The first polishing and the second polishing are also applied to the second surface 1B so that the gradual reduction area 1α can be formed. Since sapphire is hard, the surface roughness can be kept small even when being polished with a relatively strong pressure. Therefore, the gradual reduction area 1α can be formed and the surface thereof can be planarized with high precision by performing polishing with a relatively strong polishing pressure.

Figure 6:
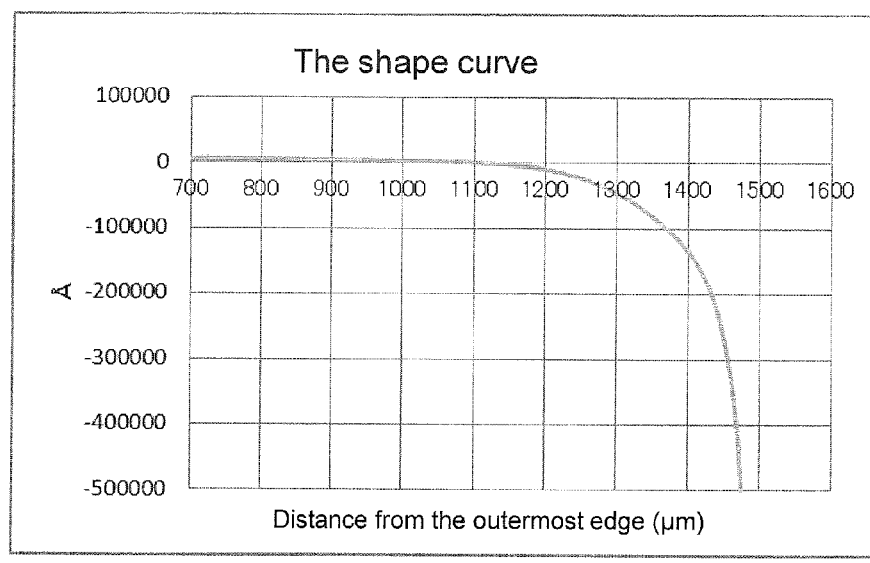
FIG. 6 illustrates measurement results of a surface shape in the vicinity of the edge of a light-transmissive cover plate.

FIG. 6 illustrates measurement results of a surface shape in the vicinity area including the peripheral edge region 11A of the light-transmissive cover plate 1 formed through the polishing process. Specifically, FIG. 6 illustrates the shape curve (a surface profile) obtained by measurement using a surface step meter on an area between the outermost edge 1E and the portion which is separated by 1.5 mm from the outermost edge 1E to the center of the light-transmissive cover plate 1. Measurement is performed on a shaped cross section scanned at 150 μm/sec using a contact needle having a tip diameter φ of 12.5 μm. In the example of FIG. 6, the width W of the gradual reduction area 1α is approximately 0.35 mm and the thickness of the peripheral edge region 11A of the first surface 1α is smaller than that of the central portion by approximately 0.01 mm to 0.05 mm. In the embodiment illustrated in FIG. 6, the arithmetic average roughness (Ra) of the central area 1β of the first surface 1A as measured using an atomic force microscope (AFM, manufactured by Digital Instruments, Inc.) is approximately 0.05 nm to 0.08 nm. The arithmetic average roughness (Ra) of the gradual reduction area 1α of the first surface 1A as measured using an atomic force microscope (AFM, manufactured by Digital Instruments, Inc.) is approximately 0.1 nm to 0.2 nm.

Figure 7:
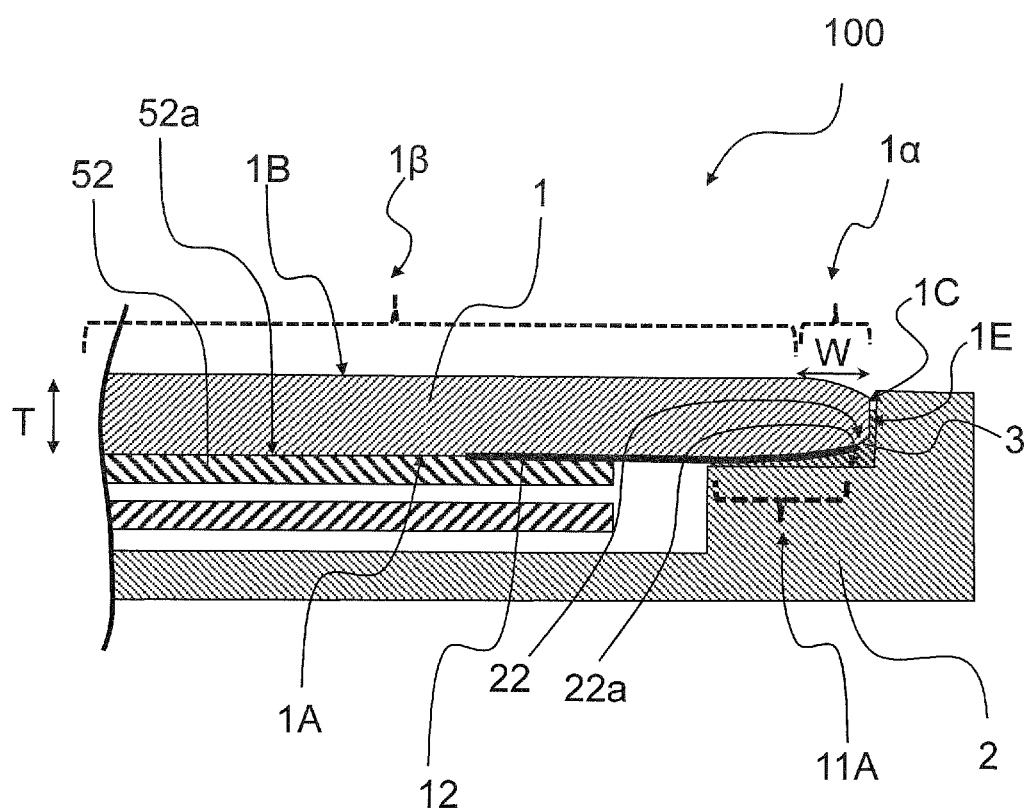
FIG. 7 is an enlarged cross-sectional view illustrating the electronic apparatus.

FIG. 7 is an enlarged cross-sectional view illustrating another embodiment of an electronic apparatus with a light-transmissive cover plate. In FIG. 7, the same configurations as those of the embodiment illustrated in FIG. 3 are denoted by the same reference numerals of FIG. 3. In the embodiment illustrated in FIG. 3, the entire peripheral edge region 11A of the first surface 1A is included in the gradual reduction area 1α. However, only a portion of the peripheral edge region 11A of the first surface 1A may be included in the gradual reduction area 1α as illustrated in FIG. 7. That is, as illustrated in FIG. 7, the gradual reduction area 1α may be smaller than that of the peripheral edge region 11A.

Figure 8A:
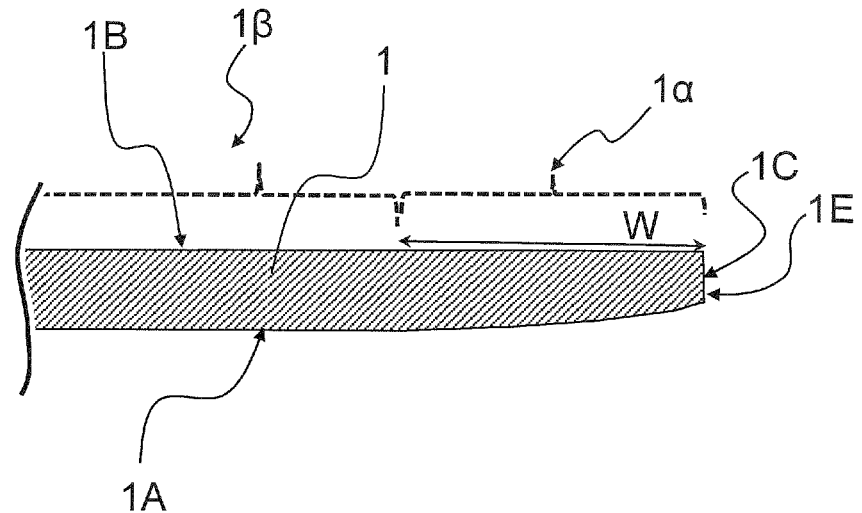
FIGS. 8A and 8B are enlarged cross-sectional views of a light-transmissive cover plate.
Figure 8B:
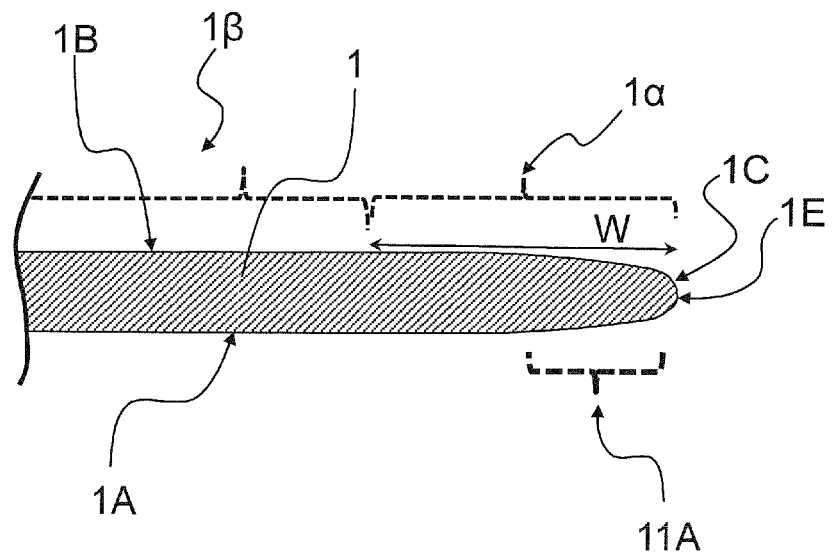

FIGS. 8A and 8B are enlarged cross-sectional views illustrating alternative embodiments of the light-transmissive cover plate 1. In FIGS. 8A and 8B, the same configurations as those of the embodiment illustrated in FIGS. 4A and 4B are denoted by the same reference numerals of FIGS. 4A and 4B. In the light-transmissive cover plate 1, the gradual reduction area 1α may be formed by making only the first surface 1A side into a curved surface as illustrated in FIG. 8A. Further, as illustrated in FIG. 8B, the entire vicinity area of the peripheral edge 11A may have a curved surface shape without including the planar side surface 1C.

<Electric Configuration of Electronic Apparatus>

Figure 9:
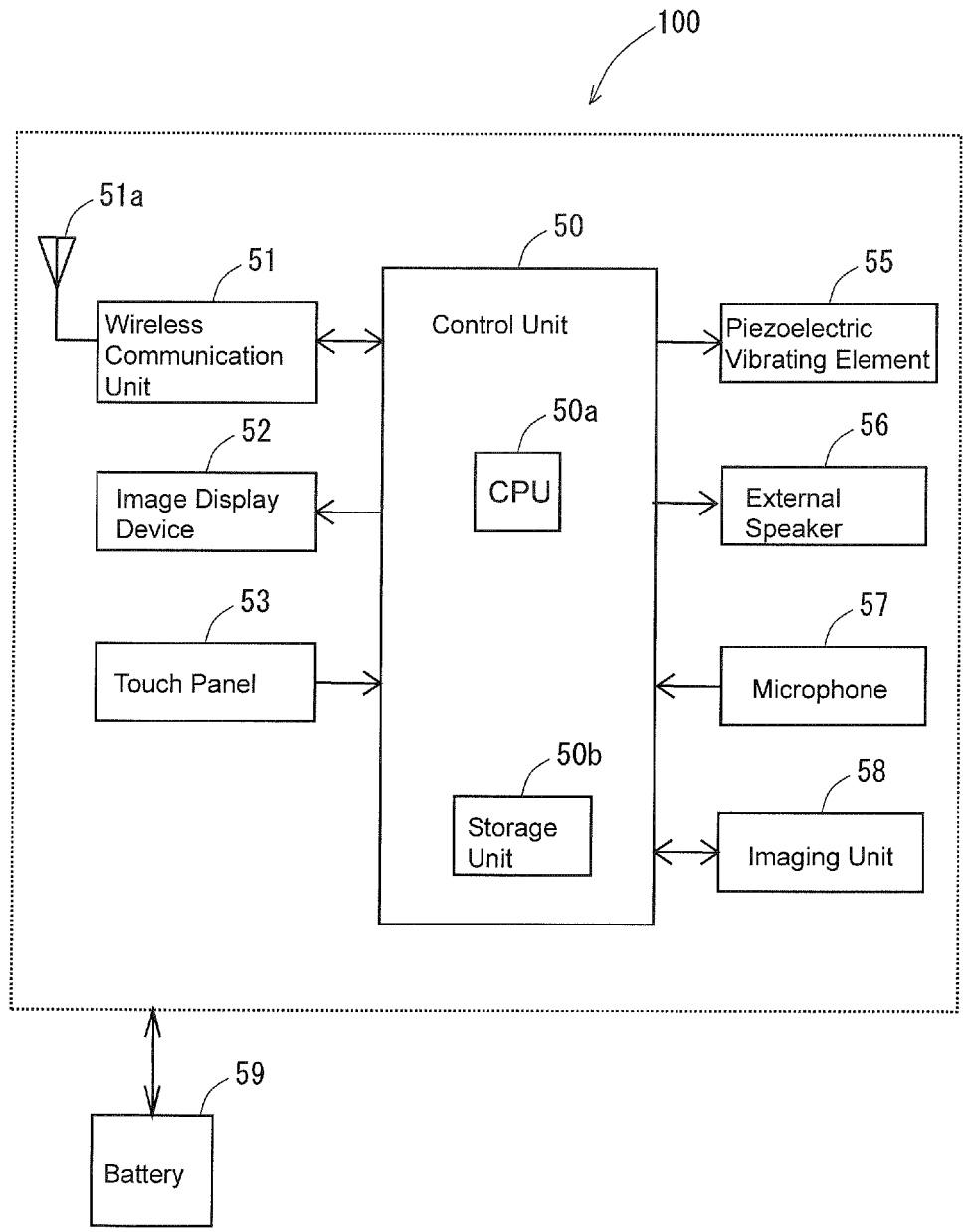
FIG. 9 is a block diagram illustrating of the electronic apparatus.

FIG. 9 is a block diagram illustrating an electric configuration of an electronic apparatus 100. As illustrated in FIG. 9, the electronic apparatus 100 includes a control unit 50, a wireless communication unit 51, an image display device 52, a touch panel 53, a piezoelectric vibrating element 55, an external speaker 56, a microphone 57, an imaging unit 58, and a battery 59. These elements are arranged in a housing configured by the light-transmissive cover plate 1 and the casing 2.

The control unit 50 includes a CPU 50a and a storage unit 50b and manages overall operations of the electronic apparatus 100 by controlling other elements of the electronic apparatus 100. The storage unit 50b is configured of a ROM and a RAM. The CPU 50a executes various programs in the storage unit 50b.

The wireless communication unit 51 receives a signal using an antenna 51a from a communication device such as a web server connected to the Internet or a mobile phone different from the electronic apparatus 100 via a base station. The wireless communication unit 51 performs an amplification process and down conversion on the received signal and outputs the signal to the control unit 50. The control unit 50 performs demodulation processing or the like on the input received signal and acquires a sound signal indicating a voice or music included in the received signal. Further, the wireless communication unit 51 performs the amplification process and up-converting on a transmission signal including a sound signal or the like generated in the control unit 50, and transmits the transmission signal using an antenna 51a after the process. The transmission signal from the antenna 51a is received by a communication device connected to the Internet or a mobile phone different from the electronic apparatus 100 via the base station.

The image display device 52 is, for example, a liquid crystal image display device as described above and displays various pieces of information such as characters, signals, and drawings on the image display surface 52a under the control of the control unit 50. The light indicting image information displayed on the image display device 52 passes through the light-transmissive cover plate 1 and enters eyes of a user of the electronic apparatus 100, and accordingly the information can be recognized by the user of the electronic apparatus 100.

The touch panel 53 may be a projection type electrostatic capacitance touch panel and detects an operation of the user on the second surface 1B of the light-transmissive cover plate 1. The touch panel 53 is attached to the first surface 1A side of the light-transmissive cover plate 1 and includes two sheets each having a sensing electrode pattern which are arranged so as to face each other. Two sheets of sensing electrode pattern are bonded to each other using a transparent adhesive sheet.

A plurality of long and narrow X electrodes that extend along an X-axis direction (for example, a lateral direction of the electronic apparatus 100) and are arranged in parallel with each other are formed on one sensing electrode pattern sheet. A plurality of long and narrow Y electrodes which respectively extend along a Y-axis direction (for example, a vertical direction of the electronic apparatus 100) and are arranged in parallel with each other are formed in the other sensing electrode pattern sheet. When a finger of the user is touched on the second surface 1B of the light-transmissive cover plate 1, the electrostatic capacitance between an X electrode and a Y electrode positioned below the touched portion is changed so that the touch panel 53 detects the operation on the second surface 1B of the light-transmissive cover plate 1. The change in the electrostatic capacitance between the X electrode and the Y electrode, which is generated in the touch panel 53, is transmitted to the control unit 50. The control unit 50 specifies the content of the operation performed on the second surface 1B of the light-transmissive cover plate 1 based on the change in the electrostatic capacitance and performs an operation according to the specified contents.

The piezoelectric vibrating element 55 is an element for transmitting a reception sound to the user of the electronic apparatus 100. The piezoelectric vibrating element 55 is vibrated by a driving voltage applied by the control unit 50. The control unit 50 generates a driving voltage based on a sound signal indicating the reception sound and applies the driving voltage to the piezoelectric vibrating element 55. The piezoelectric vibrating element 55 is vibrated by the control unit 50 based on the sound signal indicating the reception sound and thus the reception sound is transmitted to the user of the electronic apparatus 100. In this manner, the control unit 50 functions as a driving unit allowing the piezoelectric vibrating element 55 to vibrate based on the sound signal. The piezoelectric vibrating element 55 will be described below in detail.

The external speaker 56 outputs the electric sound signal from the control unit 50 by converting the signal into a sound. The sound output by the external speaker 56 is output to the outside from speaker holes 20 provided on the back surface 101 of the electronic apparatus 100.

The microphone 57 outputs the sound input by the outside of the electronic apparatus 100 to the control unit 50 by converting a sound into the electric sound signal a sound. The sound from the outside of the electronic apparatus 100 is incorporated in the electronic apparatus 100 from microphone holes 21 provided on the back surface 101 of the electronic apparatus 100 and is input to the microphone 57.

The imaging unit 58 has the imaging lens 58a, an imaging element, and the like, and images a still image and a moving image based on the control of the control unit 50.

The battery 59 outputs a power source of the electronic apparatus 100. The power source output from the battery 59 is supplied to respective electronic components such as the control unit 50 or the wireless communication unit 51 in the electronic apparatus 100.

<Details of Piezoelectric Vibrating Element>

Figure 10:
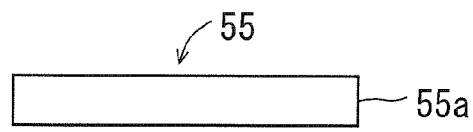
FIG. 10 is a plan view illustrating a piezoelectric vibrating element.
Figure 11:
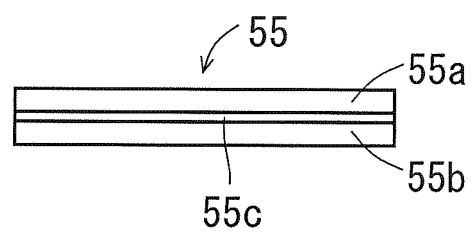
FIG. 11 is a side view illustrating the piezoelectric vibrating element.

FIGS. 10 and 11 are respectively a top view and a side view illustrating a structure of the piezoelectric vibrating element 55. As illustrated in FIGS. 10 and 11, the piezoelectric vibrating element 55 has a long shape in one direction. Specifically, the piezoelectric vibrating element 55 has a long and narrow rectangular plate shape in a plan view. The piezoelectric vibrating element 55 has, for example, a bimorph structure and includes a first piezoelectric ceramic plate 55a and a second piezoelectric ceramic plate 55b which are attached to each other through a shim material 55c.

Figure 12:
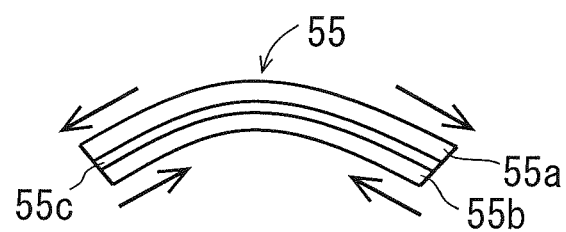
FIG. 12 is a side view illustrating a state of the piezoelectric vibrating element being bent.

As illustrated in FIG. 12, in the piezoelectric vibrating element 55, when a positive voltage is applied to the first piezoelectric ceramic plate 55a and a negative voltage is applied to the second piezoelectric ceramic plate 55b, the first piezoelectric ceramic plate 55a extends along the longitudinal direction and the second piezoelectric ceramic plate 55b contracts along the longitudinal direction. Accordingly, as illustrated in FIG. 12, the piezoelectric vibrating element 55 is bent into a convex shape with the first piezoelectric ceramic plate 55a being outside.

Figure 13:
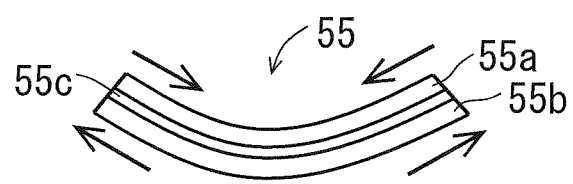
FIG. 13 is a side view illustrating a state of the piezoelectric vibrating element being bent.

As illustrated in FIG. 13, in the piezoelectric vibrating element 55, when a negative voltage is applied to the first piezoelectric ceramic plate 55a and a positive voltage is applied to the second piezoelectric ceramic plate 55b, the first piezoelectric ceramic plate 55a contracts along the longitudinal direction and the second piezoelectric ceramic plate 55b extends along the longitudinal direction. Accordingly, as illustrated in FIG. 13, the piezoelectric vibrating element 55 is bent into a convex shape with the second piezoelectric ceramic plate 55b being outside.

The piezoelectric vibrating element 55 vibrates while being bent by alternatively taking the state of FIG. 12 and the state of FIG. 13. The control unit 50 allows the piezoelectric vibrating element 55 to vibrate while being bent by applying an AC voltage in which the positive voltage and the negative voltage alternatively appear at an area between the first piezoelectric ceramic plate 55a and the second piezoelectric ceramic plate 55b.

FIGS. 11 to 13 illustrates one structure made of the first piezoelectric ceramic plate 55a and the second piezoelectric ceramic plate 55b which are bonded to each other by interposing the shim material 55c therebetween in the piezoelectric vibrating element 55. However, a plurality of the structures may be laminated to each other.

<Arrangement Position of Piezoelectric Vibrating Element>

Figure 14:
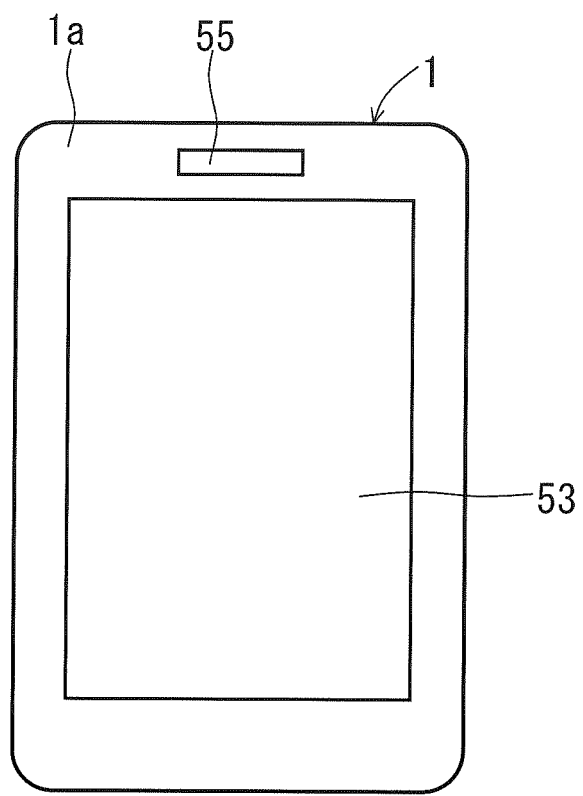
FIG. 14 is a plan view illustrating the light-transmissive cover plate.

FIG. 14 is a plan view when the light-transmissive cover plate 1 is seen from the first surface 1A side. The piezoelectric vibrating element 55 is attached to the first surface 1A of the light-transmissive cover plate 1 using an adhesive such as a double-sided tape. The piezoelectric vibrating element 55 is arranged in a position which is not overlapped with the image display device 52 and the touch panel 53 when the piezoelectric vibrating element 55 is seen from side of the first surface 1A of the light-transmissive cover plate 1 in a plan view.

<Regarding Generation of Reception Sound Due to Vibration of Piezoelectric Vibrating Element>

In the present embodiment, an air conduction sound and a conduction sound are transmitted to the user from the light-transmissive cover plate 1 via the vibration of the piezoelectric vibrating element 55. That is, the vibration of the piezoelectric vibrating element 55 is transmitted to the light-transmissive cover plate 1 so that the air conduction sound and the conduction sound are transmitted to the user from the light-transmissive cover plate 1.

Here, the term "air conduction sound" means a sound recognized in a human brain by the vibration of an eardrum due to a sound wave which enters an external auditory meatus hole (also known as an "ear hole"). On the other hand, the term "conduction sound" is a sound recognized in a human brain by the vibration of the eardrum due to the vibration of an auricle transmitted to the eardrum. Hereinafter, the air conduction sound and the conduction sound will be described in detail.

Figure 15:
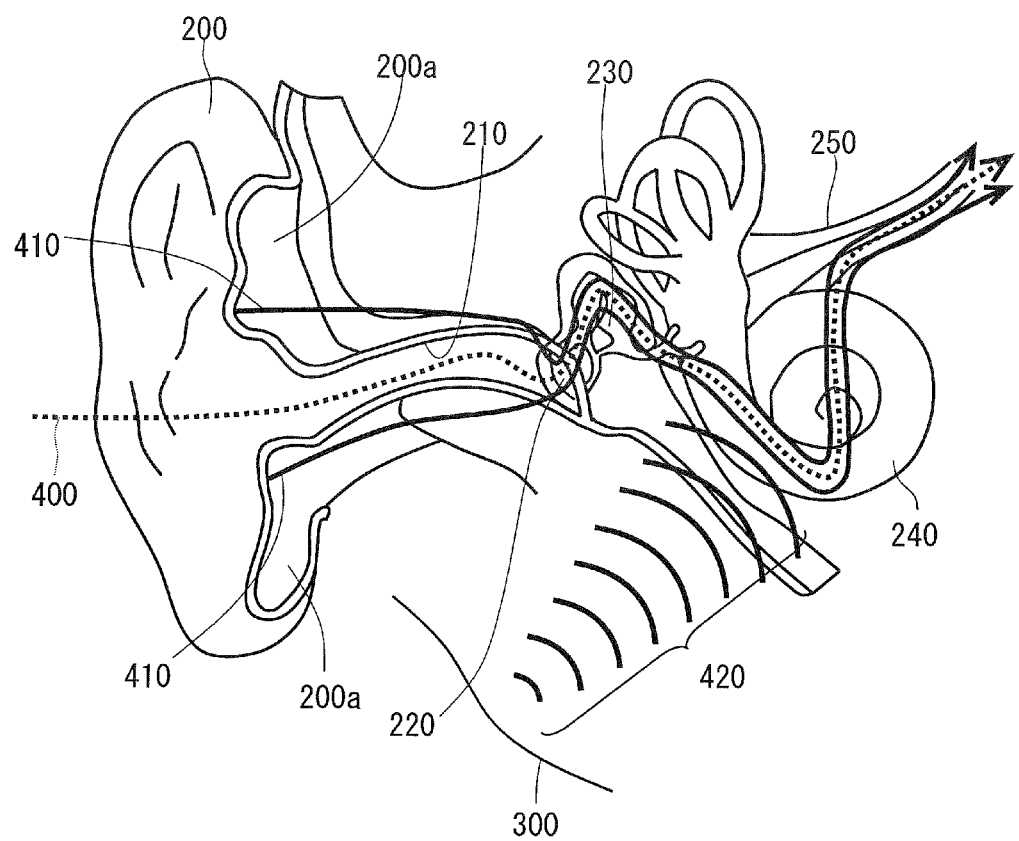
FIG. 15 is a view for describing an air conduction sound and a conduction sound.

FIG. 15 is a view for describing the air conduction sound and the conduction sound. FIG. 15 illustrates a structure of an ear of the user of the electronic apparatus 100. In FIG. 15, a wavy line 400 indicates a conduction path of a sound signal of the air conduction sound. A solid line 410 indicates the conduction path of the sound signal of the conduction sound.

When the piezoelectric vibrating element 55 mounted to the light-transmissive cover plate 1 vibrates based on the electric sound signal indicating the reception sound, the light-transmissive cover plate 1 vibrates and a sound wave is output from the light-transmissive cover plate 1. When the user moves the light-transmissive cover plate 1 of the electronic apparatus 100 close to an auricle 200 of the user by holding the electronic apparatus 100 in a hand or the light-transmissive cover plate 1 of the electronic apparatus 100 is put to the auricle 200 of the user, the sound wave output from the light-transmissive cover plate 1 enters an external auditory meatus hole 210. The sound wave from the light-transmissive cover plate 1 enters in the external auditory meatus hole 210 and the eardrum 220 vibrates. The vibration of the eardrum 220 is transmitted to au auditory ossicle 230 and the auditory ossicle 230 vibrates. In addition, the vibration of the auditory ossicle 230 is transmitted to a cochlea 240 and is converted into an electrical signal in the cochlea 240. The electrical signal is transmitted to the brain by passing through an acoustic nerve 250 and the reception sound is recognized in the brain. In this manner, the air conduction sound is transmitted from the light-transmissive cover plate 1 to the user.

When the user puts the light-transmissive cover plate 1 of the electronic apparatus 100 to the auricle 200 of the user by holding the electronic apparatus 100 in a hand, the auricle 200 is vibrated by the light-transmissive cover plate 1 which is vibrated by the piezoelectric vibrating element 55. The vibration of the auricle 200 is transmitted to the eardrum 220, and thus the eardrum 220 vibrates. The vibration of the eardrum 220 is transmitted to the auditory ossicle 230, and thus the auditory ossicle 230 vibrates. The vibration of the auditory ossicle 230 is transmitted to the cochlea 240 and is converted into an electrical signal in the cochlea 240. The electrical signal is transmitted to the brain by passing through the acoustic nerve 250 and the reception sound is recognized in the brain. In this manner, the conduction sound is transmitted from the light-transmissive cover plate 1 to the user. FIG. 15 illustrates an auricular cartilage 200a in the inside of the auricle 200.

In addition, the conduction sound herein is different from a bone conduction sound. The bone conduction sound is a sound recognized in a human brain by the vibration of the skull and direct stimulation of the inner ear such as the cochlea caused by the vibration of the skull. In FIG. 15, in a case of vibrating the jawbone 300, the transmission path of the sound signal while the bone conduction sound is recognized in the brain is indicated with a plurality of arcs 420.

In this manner, in the electronic apparatus 100 according to the present embodiment, the air conduction sound and the conduction sound can be transmitted from the light-transmissive cover plate 1 to the user of the electronic apparatus 100 due to the vibration of the light-transmissive cover plate 1 through the vibration of the piezoelectric vibrating element 55. Since the user can hear a sound when the user puts the light-transmissive cover plate 1 to the auricle 200 of the user, the communication using a telephone can be performed without concerning the position of the electronic apparatus 100 put against an ear so much. In addition, the user can hear the conduction sound due to the vibration of the auricle, the electronic apparatus 100 makes it easy for the user to hear the sound even when there is a large amount of the ambient noise. Accordingly, the user can appropriately perform communication using a telephone even when there is a large amount of the ambient noise.

In addition, even in a state in which earplugs or earphones are fixed to the ears of the user, the reception sound from the electronic apparatus 100 can be recognized by putting the light-transmissive cover plate 1 to the auricle. Further, even in the state in which headphones are fixed to the ears of the user, the reception sound from the electronic apparatus 100 can be recognized by putting the light-transmissive cover plate 1 to the headphones.

<Regarding Holes of Ear Piece (Holes for Receiver)>

In the electronic apparatus 100 according to the present embodiment, since the reception sound is generated by the vibration of the light-transmissive cover plate 1, the reception sound can be appropriately transmitted to the user even through there are no holes in the ear piece of the light transmissive cover plate 1. Therefore, production costs can be reduced because the laser processing cost associated with making such holes is no longer needed. Further, since the light-transmissive cover plate 1 has no holes in the ear piece, the strength of the light-transmissive cover plate 1 is higher than it would be if the light-transmissive cover plate 1 had holes in the ear piece. Furthermore, in the present embodiment, since there are no holes of the ear piece on the surface of the electronic apparatus 100, the problem of water or dust entering the holes of the ear piece is eliminated. Therefore, the necessity for a water-proof structure or a dust-proof structure along with the cost of such structures is reduced.

In the above-described embodiment, a case of a mobile phone to which the present invention is applied is described. However, the present invention can be applied to an electronic apparatus other than the mobile phone. For example, embodiments may be applicable to tablet terminal, e-readers, digital cameras, video game consoles, digital music players, personal digital assistance (PDA), personal handy phone system (PHS), laptop computers, portable TV's, Global Positioning Systems (GPS's) or navigation systems, machining tools, pedometers, health equipment such as weight scales, display monitors, smartwatches, and the like. In addition, the present invention is not limited to the above-described embodiments, and various modifications and changes may be made in the range not departing from the scope of the present invention.

What is claimed is:

1. A portable communication device, comprising:
a casing;
an image display device, at least a portion of which is housed in the casing; and
a sapphire plate, with a first surface that faces the image display device and the casing;
wherein the sapphire plate includes a gradual reduction area of which the thickness is gradually reduced toward an outermost edge of the sapphire plate,
wherein the first surface has a curved portion in the gradual reduction area.

2. A portable communication device according to claim 1, wherein the thickness of the outermost edge of the gradual reduction area is less than the thickness of the central area of the sapphire plate by the range of 0.01 mm to 1 mm.

3. A portable communication device according to claim 1, wherein the width of the gradual reduction area is 0.1 mm to 5 mm.

4. The portable communication device according to claim 1, further comprising:
a joining member that bonds the sapphire plate to the casing,
wherein the joining member is positioned between the gradual reduction area of the sapphire plate and the casing.

5. The portable communication device according to claim 4, wherein the joining member has a Young's modulus smaller than that of the sapphire plate.

6. The portable communication device according to claim 4, wherein the arithmetic average roughness of the gradual reduction area is larger than the arithmetic average roughness of the central area of the sapphire plate.

7. A portable communication device according to claim 6, wherein the value of arithmetic average roughness of the gradual reduction area is 0.1 nm to 0.2 nm.

8. A portable communication device according to claim 6, wherein the value of arithmetic average roughness of the central area of the sapphire plate is 0.05 nm to 0.08 nm.

9. A portable communication device according to claim 6, wherein the value of arithmetic average roughness of the gradual reduction area is 0.1 nm to 0.2 nm and the value of arithmetic average roughness of the central area of the sapphire plate is 0.05 nm to 0.08 nm.

10. A portable device, comprising:
a casing;
an image display device, at least a portion of which is housed in the casing; and
a sapphire plate, with a first surface that faces the image display device and the casing;
wherein the sapphire plate includes a gradual reduction area of which the thickness is gradually reduced toward an outermost edge of the sapphire plate,
wherein the first surface extends away from the image display device in the gradual reduction area.

11. A portable device, comprising:
a casing;
an image display device, at least a portion of which is housed in the casing; and
a sapphire plate, with a first surface that faces the image display device and the casing;
wherein the sapphire plate includes a gradual reduction area of which the thickness is gradually reduced toward an outermost edge of the sapphire plate,
wherein the casing includes a part facing the first surface, and the first surface extends away from the part of the casing in the gradual reduction area.

* * * * *